United States Patent [19]

Heath

[11] Patent Number: 5,344,108

[45] Date of Patent: Sep. 6, 1994

[54] PIPE SURGE RESTRAINER FOR USE WITH PIPE HANGER

[75] Inventor: Richard W. Heath, Yorba Linda, Calif.

[73] Assignee: Tolco, Incorporated, Corona, Calif.

[21] Appl. No.: 882,815

[22] Filed: May 14, 1992

[51] Int. Cl.5 ............................................. F16L 3/00
[52] U.S. Cl. .................................... 248/62; 248/300; 248/74.3
[58] Field of Search ..................... 248/62, 58, 59, 60, 248/300, 231.8, 317, 316.7, 74.2, 610, 74.3

[56] References Cited

U.S. PATENT DOCUMENTS

| | | | |
|---|---|---|---|
| 428,690 | 5/1890 | McKelvey | 248/59 |
| 1,124,648 | 1/1915 | Penniman . | |
| 2,111,357 | 3/1938 | Cornell, Jr. . | |
| 3,131,447 | 5/1964 | Tinnerman | 248/231.8 |
| 3,218,011 | 11/1965 | Ammann . | |
| 3,236,482 | 2/1966 | Fitzgerald . | |
| 3,872,947 | 3/1975 | Cranfield | 248/65 X |
| 4,330,491 | 5/1982 | Doshi et al. | 248/58 X |
| 4,413,799 | 11/1983 | Gabriel | 248/59 |
| 4,858,860 | 8/1989 | Richards | 248/62 |

FOREIGN PATENT DOCUMENTS

| | | | |
|---|---|---|---|
| 834304 | 2/1952 | Fed. Rep. of Germany | 248/62 |
| 208750 | 11/1966 | Sweden | 248/62 |

OTHER PUBLICATIONS

Copy of a Tolco, Inc. advertisement showing the Surge Retainer in *Fire Protection Contractor*, dated Feb. 1992.

Primary Examiner—Karen J. Chotkowski
Attorney, Agent, or Firm—Knobbe, Martens, Olson & Bear

[57] ABSTRACT

A pipe surge restrainer between a pipe hanger and a liquid carrying pipe resists upward surging movement of the pipe when the liquid pressure changes. One form of the restrainer is initially a flat strap having two legs, two transverse arms spaced from the legs but connected to the legs at one end by bridges, and a connecting wall remote from the arms and located between the two legs. The strap is bent into a generally U-shape with the legs and arms extending vertically upright and parallel and linked by the integral wall. The arms are bent into opposing rod receiving shapes and the bridges are bent toward each other to bring the arms closer together to form a clip. The restrainer legs are positioned within the space between the pipe and a yoke of the hanger with the clip engaging the hanging rod or swivel nut above the yoke, the connecting wall near the pipe, and the upper edge of the legs directly adjacent the yoke, thereby providing a spacer which retains the pipe in position.

In another form, the restrainer is initially a flat strap having two elongated sides, two concave curved ends, and an aperture located intermediate the two ends. The strap is bent into a generally truncated triangular shape having one flat apex formed about the aperture, and two other apexes which are formed from the concave curved ends and linked by an integral tab on one curved end. The restrainer is positioned within the space between the pipe and a yoke of the hanger with the concave curved ends engaging the liquid carrying pipe and the apertured apex directly adjacent the yoke.

7 Claims, 6 Drawing Sheets

PIPE SURGE RESTRAINER FOR USE WITH PIPE HANGER

FIELD OF THE INVENTION

The present invention relates to restraining movement of suspended liquid carrying pipes during surging of liquid in the pipe.

DESCRIPTION OF THE PRIOR ART

Liquid carrying pipes, such as in fire prevention sprinkler systems, are typically suspended from a support via a pipe hanger. A typical pipe hanger comprises a metal strap bent into a teardrop shape with the ends engaging one another. A tubular hanging rod protrudes through the overlapping ends. A clasp couples the hanging rod and the overlapping ends of the strap together. The hanging rod is attached to the support, thereby providing the equivalent of a stirrup for a liquid carrying pipe. A lower part of the teardrop-shaped portion of the pipe hanger is typically labelled a saddle while an upper part of the teardrop-shaped portion of the pipe hanger is typically labelled a yoke. To facilitate the insertion of the pipe in the hanger, and also to allow the hanger to be adjusted relative to the hanging rod, a space exists between the pipe and the yoke after the liquid carrying pipe is hung in the saddle. This space is typically between one and two inches in the vertical dimension, depending on the pipe and hanger sizes.

Typically, liquid within the pipe is under pressure such that liquid flows out of the pipe at a sufficient rate. When an outlet in the pipe is suddenly opened, pressurized liquid is forced from the outlet and the interior of the pipe experiences a sudden pressure gradient and nominal pressure drop. This pressure change creates forces on the pipe which, if large enough, cause the pipe to move away from its resting position in the pipe hanger. This movement is called pipe surge.

Pipe surge may cause the pipe to bend and sway excessively. The material of the pipe may not be able to withstand such forces, resulting in damage to the pipe. Damage to the pipe may have serious detrimental effects which reduce the liquid transport capabilities of the pipe or lead to total failure. In addition, if the pipe surge is violent enough, or repeated over time, the lower end of the hanging rod may puncture or otherwise weaken the pipe.

Earthquakes may also cause serious problems with pipe hangers of the prior art. Sudden massive vibrations of the ground can create a situation similar to pipe surge where the pipe lifts up out of the saddle and collides with the hanging rod or yoke. The space between the pipe and hanging rod or yoke may be up to two inches and thus the momentum generated by the upwardly accelerating pipe may be quite significant. Another concern is the aforementioned bending or swaying of the pipe within the hanger. Furthermore, the liquid-carrying pipes weigh a substantial amount and the violent up-and-down motion of the pipe may stress the hanging rod to failure, or rupture the mounting hardware connecting the rod to the ceiling structure.

Even if the pipe or mounting hardware are not damaged, pipe surge may create situations where liquid within the pipe does not reach its destination. One such situation may occur in the fire sprinkler industry. In fire sprinkler systems, sprinklers protrude from the pipe and through a ceiling to sprinkle water over a room when a fire occurs. However, when water is initially discharged from the sprinklers, pipe surge may cause the water carrying pipe to rise away from the saddle. This may, in turn, cause the sprinkler to rise above the level of the ceiling, thereby limiting the flow of water into the burning room.

One method which has been employed to combat pipe surge is to form a modified pipe hanger having a saddle and yoke configured to wrap tightly around the pipe. U.S. Pat. Nos. 1,124,648 to Penniman; 2,111,357 to Cornell, Jr.; 3,218,011 to Amman; and 3,236,482 to Fitzgerald each disclose different types of such modified pipe hangers. However, many teardrop shaped pipe hangers are already in use, particularly in the fire sprinkler systems. It would be exceedingly expensive to replace each of these teardrop shaped pipe hangers.

U.S. Pat. No. 428,690 to McKelvey discloses a generally circular pipe hanger having a diameter substantially larger than the liquid carrying pipe supported therein, leaving a space between the liquid carrying pipe and the yoke of the pipe hanger. A hanging rod extends through the yoke of the pipe hanger and contacts the liquid carrying pipe, thereby stabilizing the pipe against surge. However, because the hanging rod must contact the pipe, it is difficult to manipulate the position of the pipe hanger on the hanging rod, making it is difficult to control the distance between the pipe and the support and therefore, the height of which the pipe hangs. Additionally, this method cannot be utilized to retro-fit installed pipe hangers.

Thus, a need exists for an apparatus and a method which allows easy control of movement between a liquid carrying pipe and a support. Additionally, a need exists for an apparatus which may be employed to retro-fit installed pipe hangers to prevent pipe surge.

SUMMARY OF THE INVENTION

A pipe surge restrainer which may be advantageously utilized with existing pipe hangers to retro-fit such hangers and also with new installations of pipe hangers is provided by the present invention. The surge restrainer is made from a flat strip of metal bent to form two spaced legs sized to extend between an upper yoke of the pipe hanger and the pipe supported by the hanger. The lower ends of the legs are joined by a connector and the legs define a gap for receiving the lower end of a rod supporting the pipe hanger. Means are provided cooperating with the rod for maintaining the restrainer legs in position between the yoke and the pipe.

In one form of the invention, the legs and the connector wall form a generally U-shape opening upwardly. Each parallel side or leg has an elongated cut-out proximate the upper end defining arms which are bent to grip a typical swivel nut of a pipe hanger. The surge restrainer is positioned over an already installed pipe hanger by clipping the arm sections over the knurled shank portion of the swivel nut. In this arrangement, the flat yoke of the pipe hanger and collar of the swivel nut are slotted into the cut-outs, while the hanger rod extends into the U-shaped gap. The lower surface of the bottom wall is spaced from but close to the pipe. The surge restrainer thereby forms a support or spacer between the pipe hanger and the pipe to restrict upward movement of the pipe within the pipe hanger.

An alternative height-adjustable surge restrainer is made from a flat strip bent into a generally trapezoidal shape with a short flat upper wall having an aperture within it. A base, opposite the upper wall has two ends which are preferably formed as concave curves. The surge restrainer is positioned within a pipe hanger, between a pipe and a generally flat yoke spaced above the pipe. The flat upper wall abuts the flat yoke and the curved ends forming the base of the surge restrainer are positioned over the pipe. The main bend angle is variable and the surge restrainer thereby forms an adjustable support or spacer between the pipe hanger and the pipe such that the pipe generally cannot move upwardly within the pipe hanger.

DETAILED DESCRIPTION OF THE INVENTION

(a) Embodiment of FIGS. 1-6

Figure 1:
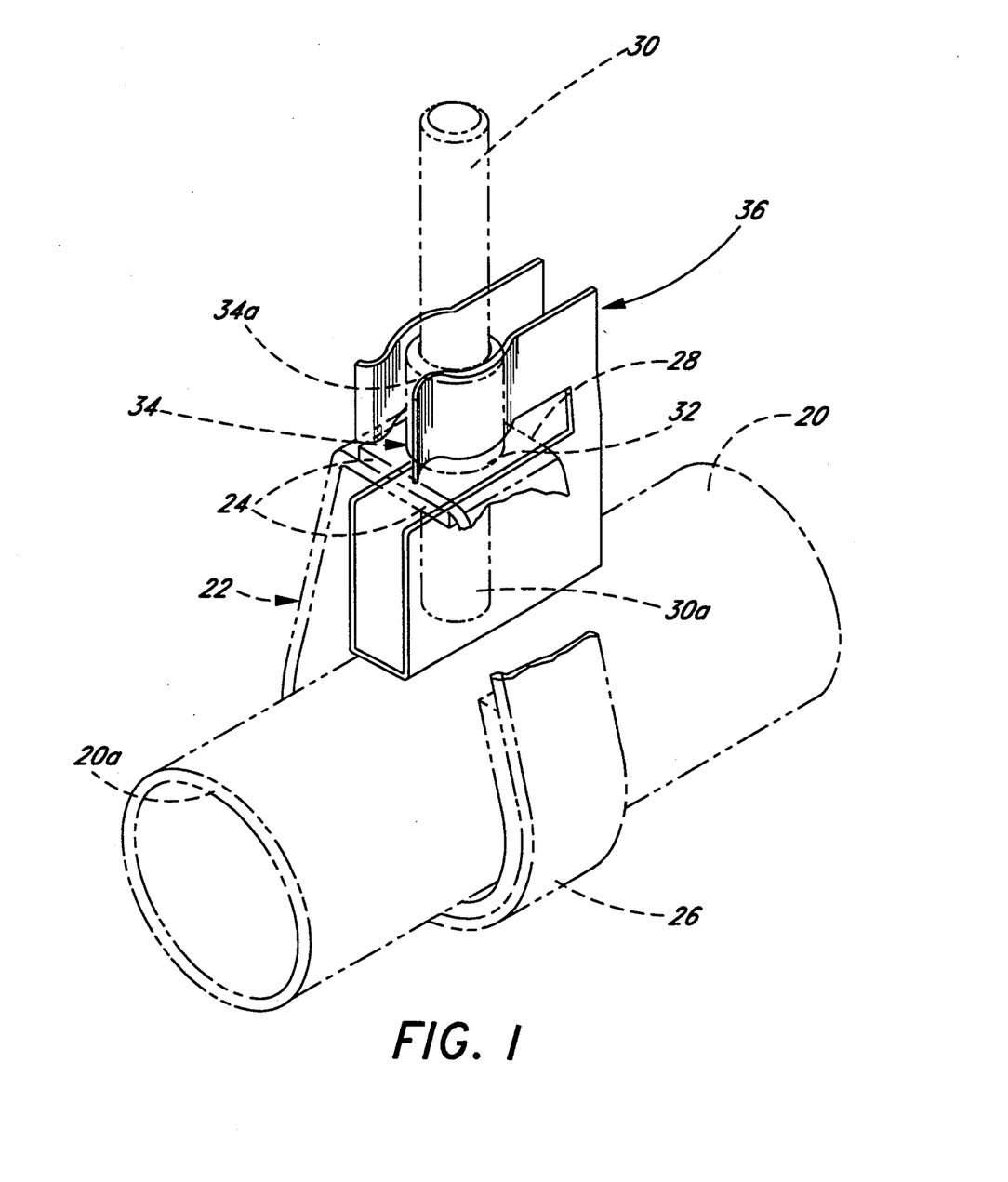
FIG. 1 shows a perspective view of a surge restrainer of the present invention in use.

Referring to FIG. 1, there is shown a liquid carrying pipe 20 suspended by a pipe hanger 22. Typically, fire prevention sprinkler pipes are suspended from an overhead support within a ceiling space (not shown). The pipe hanger 22 comprises a teardrop-shaped unit formed by bending a flat strip of metal having two ends 24 and folding the two ends 24 over one another. A lower portion of the pipe hanger 22 is labelled a saddle 26, while an upper portion of the pipe hanger 22 is labelled a yoke 28. The pipe 20 rests within the saddle 26 leaving a space between the pipe 20 and the yoke 28.

A threaded, tubular pipe, referred to herein as a hanging rod 30, extends through aligned holes 32 in the overlapping ends 24 of the pipe hanger 22. An upper portion of the hanging rod 30 is typically threaded such that it may be inserted into a bracket (not shown) to suspend the pipe hanger 22 from the overhead support. A lower portion 30a of the hanging rod 30, about which the aligned holes 32 are positioned, is also typically threaded to accept an internally threaded swivel nut 34. The nut 34 has a knurled shank 34a of outer diameter slightly less than the diameter of the aligned holes 32 in the ends 24 of the pipe hanger 22. This knurled shank 34a facilitates manual adjustment of the swivel nut 34 on the hanging rod 30. A collar 34b (not shown in FIG. 1 but shown in FIGS. 5 and 6) forms the bottom of the swivel nut 34, the collar 34b having a larger diameter than the aligned holes 32 in the ends 24 of the pipe hanger 22.

To assemble, the ends 24 of a hanger 22 are separated and a section of pipe 20 inserted into the saddle portion 26. The ends 24 come together above the pipe 20, aligning the holes 32 so that the lower portion 30a of the previously mounted hanging rod 30 inserts therethrough. The swivel nut 34 threads onto the hanging rod 30 such that the collar 34b of the swivel nut 34 is nearest the saddle 26 and the knurled shank 34a of the swivel nut 34 inserts through the aligned holes 32 in the ends 24 of the pipe hanger 22. The collar 34b cannot fit through the aligned holes 32, thus the yoke 28 of the pipe hanger 22 hangs on the collar 34b of the swivel nut 34.

To adjust the distance between the pipe hanger 22 and the support, the hanging rod 30 may be threaded further into the bracket (not shown). Additionally, by manually turning the knurled shank 34a of the swivel nut 34 on the threaded lower portion 30a of the hanging rod 30, the distance at which the pipe hanger 22, and therefore the pipe 20, hangs from the support may be altered.

Liquid within the pipe 20 is under sufficient pressure to cause the liquid to flow out of the pipe when an outlet (not shown) is opened. When the outlet is initially opened, pressurized liquid is forced from the outlet and the interior of the pipe experiences a sudden pressure gradient and nominal pressure drop. The sudden pressure change may create forces on the pipe 20 which cause the pipe to surge upwardly within the pipe hanger 22. Such movement of a generally rigid pipe 20 may seriously damage the integrity of the pipe 20 or mounting means, or even lead to total failure of the pipe 20. A situation similar to pipe surge may result from an earthquake where the pipe is caused to violently buck within the pipe hanger 22.

As noted above, even if a fire sprinkler pipe 20 is not damaged, pipe surge may cause the outlet of the pipe 20 to surge upwardly such that a sprinkler connector to the pipe no longer protrudes through a ceiling below the pipe. Further, when the pressure differential which causes pipe surge alleviates, the sprinkler may not return to its initial position due to some obstruction. In this case, the sprinkler system may totally fail to put out a fire.

To prevent movement of a pipe 20 due to pipe surge, a pipe surge restrainer 36 is inserted into the space between the pipe 20 and the yoke 28. The surge restrainer 36 is typically made of a rigid material such as metal or plastic, depending upon the material of which the pipe 20 is made and how robust the restrainer should be to hold the pipe 20 generally motionless in the saddle 26.

Figures 2, 4:
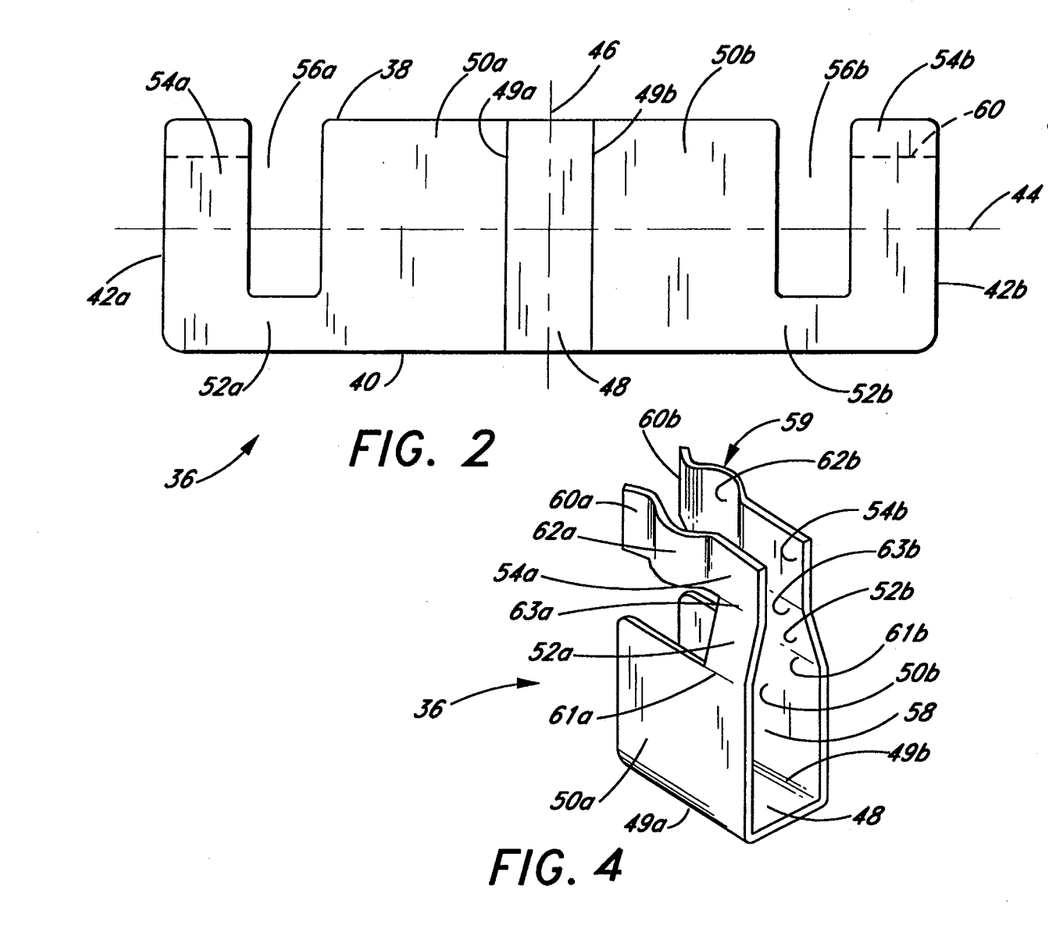
FIG. 2 shows a plan view of the surge restrainer of FIG. 1 after being stamped but before being bent to shape.
FIG. 4 shows a perspective view of the completed surge restrainer of FIG. 1.

A preferred embodiment of a pipe surge restrainer 36 suitable for any type of pipe 20 is shown in the perspective view of FIG. 1. As shown in FIG. 2, the restrainer 36 is initially formed flat, cut from a strip of metal in a generally rectangular shape having two elongated, generally parallel sides 38, 40 and first and second ends 42a,b. A longitudinal axis 44 of the restrainer 36 is formed between the center of the ends 42a,b. A transverse axis 46 is formed perpendicular to the longitudinal axis 44 at approximately the center of the restrainer 36.

The restrainer 36 comprises a middle connector wall 48 and symmetric sections outward from the connector wall to the ends 42a,b. For simplicity, only one half of the restrainer 36 from the connector wall 48 to the end 42a will be described, with the understanding that a mirror image exists across the transverse axis 46, and that element numbers with the subscript a have counterparts with the subscript b. An interface line 49a runs parallel to the transverse axis 46 directly adjacent the connector wall 48. A solid wall or leg 50a on the opposite side of the interface 49a from the connector wall 48 extends slightly more than half of the way to the end 42a. A bridge 52a connects the leg 50a to an arm 54a proximate the end 42a of the restrainer 36. An elongated rectangular cut-out 56a separates the arm 54a from the leg 50a, and extends from the front side 38 a substantial distance toward the rear side 40, parallel to the end 42a.

Figure 3:
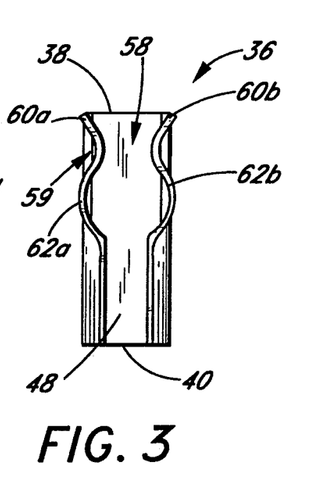
FIG. 3 shows a top plan view of the completed surge restrainer of FIG. 1.

The assembled restrainer 36 is shown in FIGS. 3 and 4. The restrainer 36 undergoes several bending and shaping operations to attain its final three-dimensional form. The restrainer 36 generally assumes its shape after the walls or legs 50a,b are bent at the interface lines 49a,b towards each other 90 degrees in relation to the plane of the connector wall 48. The wall 48 thus separates the aforementioned symmetric regions of the restrainer by a gap 58. Slight inward bends 61a,b are made at the junction of the legs 50a,b and bridges 52a,b. Outward bends 63a,b of similar angle are made at the junction off the bridges 52a,b and the arms 54a,b.

As seen best in FIG. 4, the gap 58 remains parallel to the legs 50a,b and narrows in the region between the two arms 54a,b. Deformation of the arms 50a,b produces a clip 59 for removable attachment to the knurled shank 34a of the swivel nut 34. The clip 59 comprises entry wings 60a,b and arcuate gripping portions 62a,b formed by bowing out the arms 50a,b at a line midway from the bridges 52a,b to the side 38. The gripping portions 62a,b face each other across the gap 58 and partially define a circular region within the gap for receiving the knurled shank 34a of the swivel nut 34. The distal end of each arm 54a,b bends outward slightly along a line 60 parallel with the longitudinal axis 44 to form the entry wings 60a,b. Preferably, the entry wings 60a,b bend outward at about a thirty degree angle.

Figure 5:
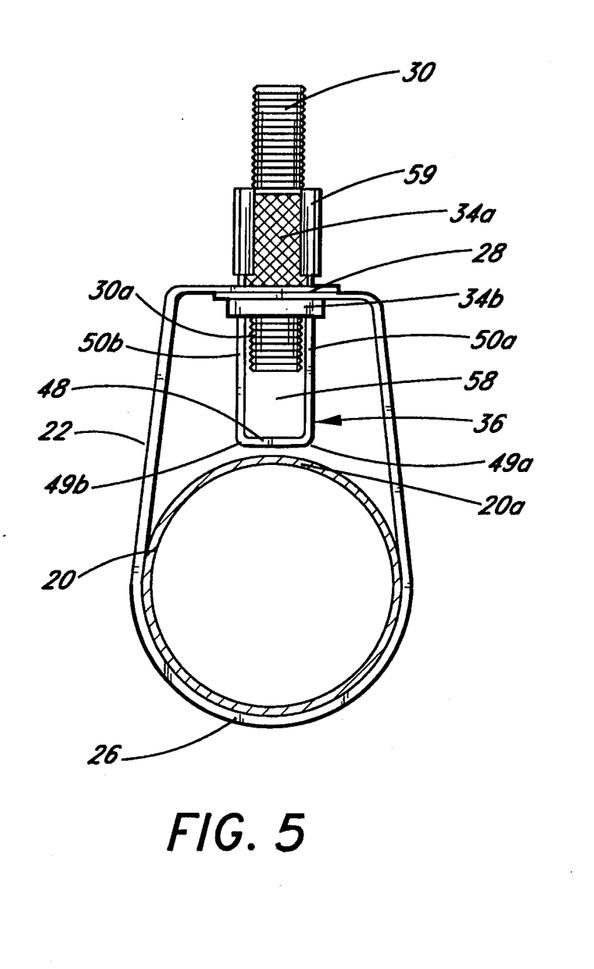
FIG. 5 shows a front elevational view of the surge restrainer in use.
Figure 6:
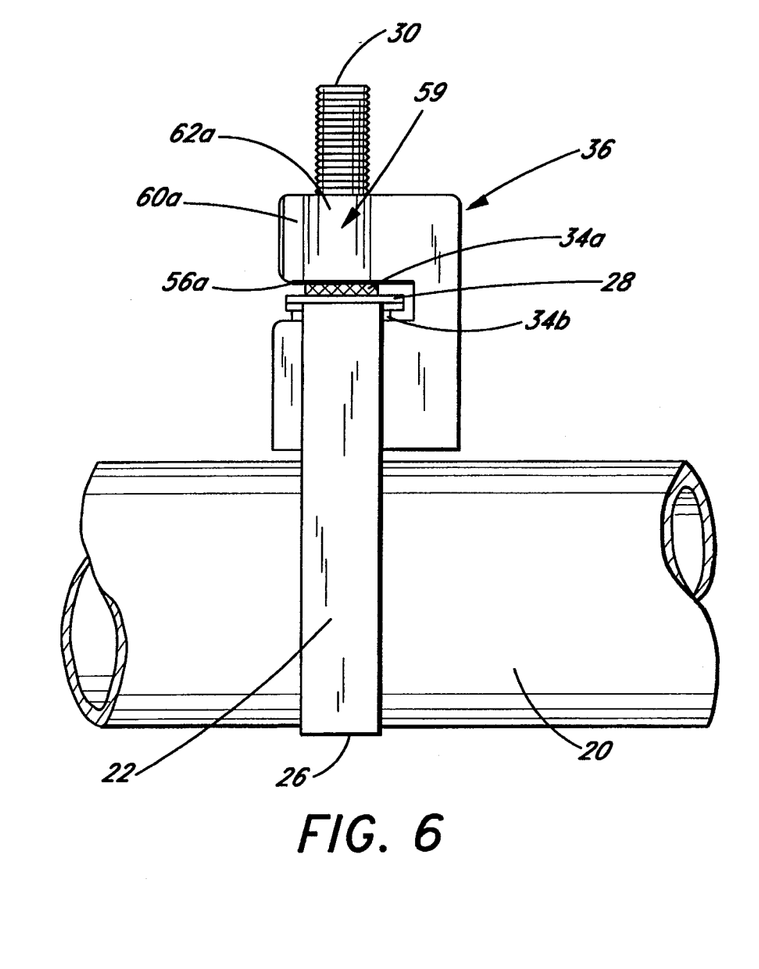
FIG. 6 shows a side elevational view of the surge restrainer in use.

To install the restrainer 36, the lower portion 30a of the hanging rod 30 inserts through the holes 32 in the ends 24 of the hanger and the swivel nut 34 threaded thereon. As discussed previously, the pipe surge restrainer 36 is employed with pipe hangers 22 having a space of about one to two inches between the pipe 20 and the yoke 28 of the pipe hanger 22, as shown in FIGS. 1, 5 and 6. The clip 59 of the restrainer 36 is pressed onto the knurled shank 34a with the yoke 28 of the pipe hanger 22 and the collar 34b of the swivel nut 34 slotting into the elongated cut-outs 56a,b. The downwardly extending portion of the hanging rod 30 inserts into the gap 58 between the legs 50a,b. The legs 50a,b and connector wall 48 thus define a U-shaped strut which comes close to filling the space between the pipe 20 and the yoke 28 of the pipe hanger 22, thereby preventing pipe surge. Advantageously, the bends at the interfaces 49a,b provide contact surfaces which will not mar or otherwise cut into the pipe 20 in the event the restrainer 36 engages the pipe in preventing pipe surge.

In addition to maintaining the position of the pipe 20 within the pipe hanger 22, the pipe surge restrainer 36 ensures that the pipe hanger 22 cannot move with respect to the swivel nut 34, i.e., up and down along the axis of the hanging rod 30. The surge restrainer 36 forms a strut which effectively prevents motion of the pipe hanger 22 relative to the hanging rod 30 by not allowing the overlapping ends 24 of the pipe hanger 22 any room to move with respect to the hanging rod 30.

In one embodiment of the present invention for use in the fire sprinkler industry where liquid carrying pipes 20 are generally approximately one inch in diameter, between approximately twenty thousandths to forty thousandths inch thick pre-galvanized steel is employed to construct the surge restrainer 36.

Typical dimensions for a pipe surge restrainer 36 used in this instance are approximately four inches long when unbent. The width between the sides 38, 40 of the restrainer 36 is typically approximately 1 5/16 inch. The short dimension of the arms 54a,b is approximately ½ inch and the elongated cut-outs 56a,b are approximately ⅜ inch wide.

It will be understood that although the above description is for a pipe surge restrainer 36 for one inch inner diameter plastic pipes 20, the pipe surge restrainer 36 of the present invention may be manufactured in many other sizes and shapes which will be obvious to one skilled in the art. For example, another embodiment of the pipe surge restrainer of the present invention may be advantageously utilized with pipe which is not easily cut and damaged, such as metal pipe.

(b) Embodiment of FIGS. 7–13

Figure 7:
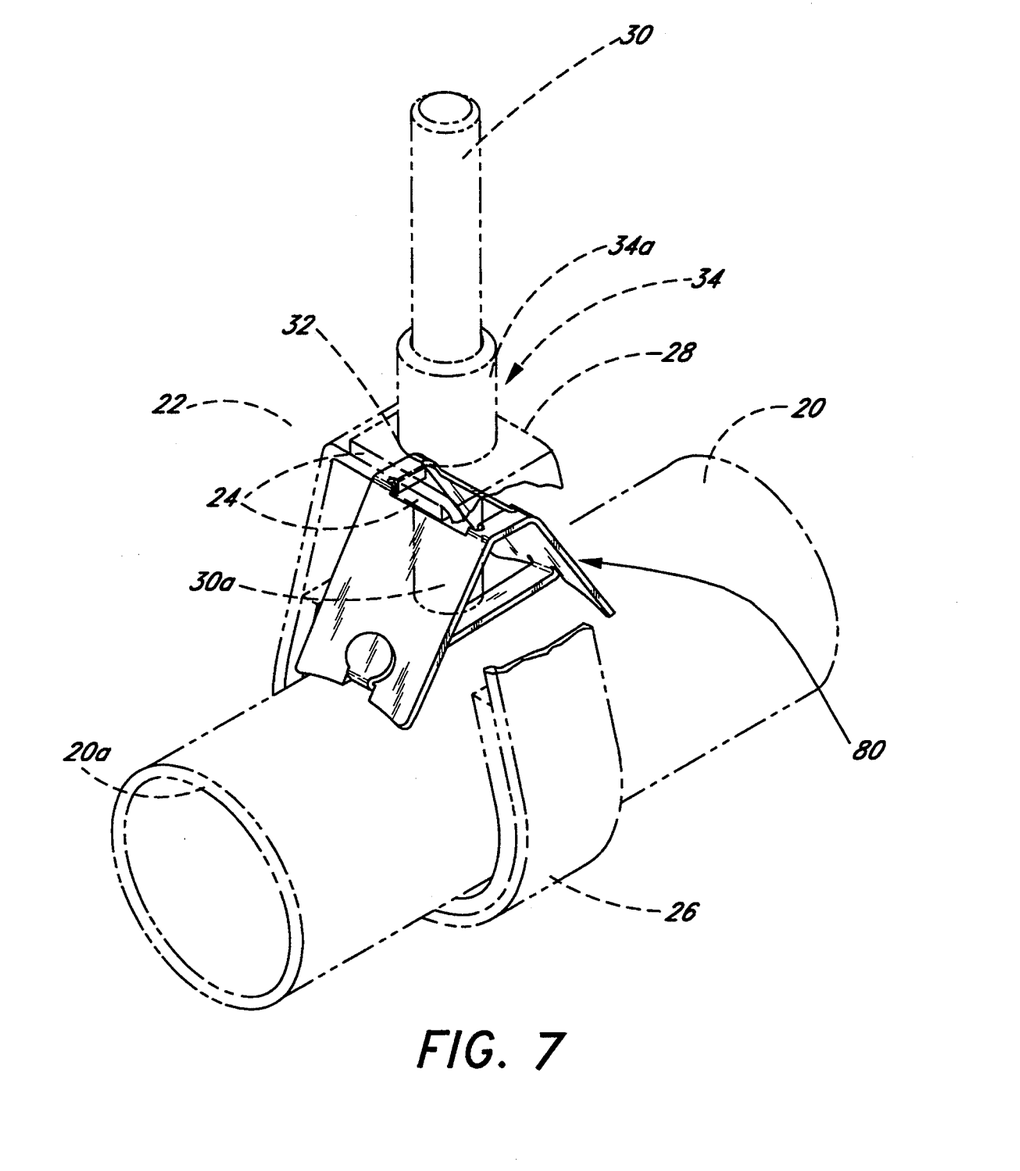
FIG. 7 shows a perspective view of an alternative embodiment of a surge restrainer in use.
Figure 8:
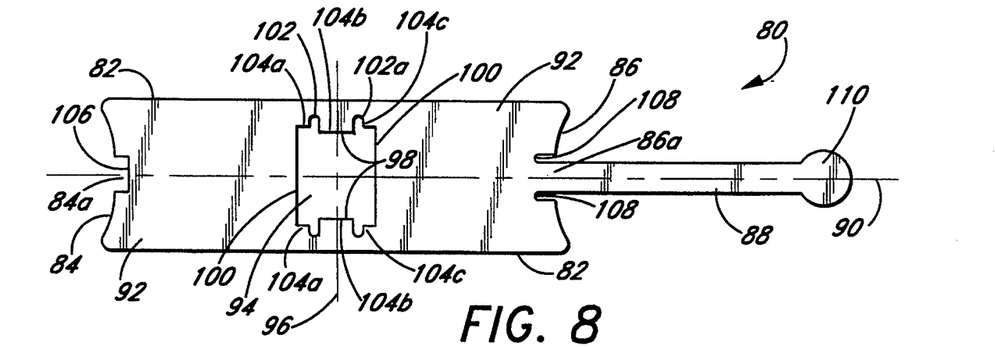
FIG. 8 shows a plan view of the surge restrainer of FIG. 7 before being bent to shape.

A second embodiment of pipe surge restrainer 80 designed for use with metal pipes 20 is shown installed in a typical pipe hanger 22 in the perspective view of FIG. 7. As shown in FIG. 8, the restrainer 80 is initially formed flat, cut from a strip of metal in a generally rectangular shape having two elongated, generally parallel sides 82 and a first and second end 84, 86 formed in a concave curve having a first 84a and second 86a apex, respectively, pointing toward one another. The second end 86 has a tab 88 protruding from the second apex 86a, pointing away from the first end 84. A longitudinal axis 90 of the restrainer 80 is formed between the apexes 84a and 86a of the ends 84 and 86. The restrainer 80 comprises two legs 92 defined between the sides 82 of the restrainer 80 and separated by an aperture 94 located approximately midway between the two concave circular ends 84 and 86. A transverse axis 96 is formed perpendicular to the longitudinal axis 90 at approximately the center of the aperture 94.

The aperture 94 is generally rectangular, having a first pair of sides 98 aligned parallel to the longitudinal axis 90 of the restrainer 80 and a second pair of sides 100 aligned parallel to the transverse axis 96 of the restrainer 80. The transverse axis 96 of the restrainer 80 intersects the first pair of sides 98 at approximately the center of each of the first sides 98, while the longitudinal axis 90 of the restrainer 80 intersects the second pair of sides 100 at approximately the center of each of the second sides 100.

Two sets of two generally semi-elliptical notches 102 are parallel with the transverse axis 96 of the restrainer 80, each notch 102 being located intermediate the transverse axis 96 of the restrainer 80 and each of the second pair of sides 98 of the aperture 94. Each semi-elliptical notch 102 has an apex 102a which points toward the nearest side 82 of the restrainer 80. The semi-elliptical notches 102 separate each of the first pair of sides 98 of the aperture 94 into three segments. On each of the first sides 98 of the aperture 94, a first fold segment 104a is formed between one of the second set of sides 100 of the aperture 94 and one of the semi-elliptical notches 102 which is located closest to this second side 100. A generally rectangular member 104b is formed on each of the first sides 98 of the aperture 94, intermediate the two semi-elliptical notches 102. Additionally, a second fold segment 104c is formed on each of the first sides 98 of the aperture 94 between the other of the second set of sides 100 of the aperture 94 and the other of the semi-elliptical notches 102.

A generally rectangular notch 106 is formed at the apex 84a of the first end 84, the center of the rectangular notch 106 generally aligned with the longitudinal axis 90 of the restrainer 80. The elongated tab 88 extends along the longitudinal axis 90 of the restrainer from the second end 86 of the restrainer 80. Two notches 108 are formed in the second end 86 of the restrainer 80, located on either side of the tab 88. The notches 108 are deep enough that when the tab 88 is bent to a position approximately 90 degrees from the longitudinal axis 90 of the restrainer 94, a generally rectangular notch similar to the rectangular notch 106 in the first end 84 of the restrainer 80 is formed. The tab 88 is slightly shorter in length than the distance between the first and second ends 84 and 86 of the restrainer 80. The tab 88 has a generally circular tip 110 at its unattached end.

Figure 9:
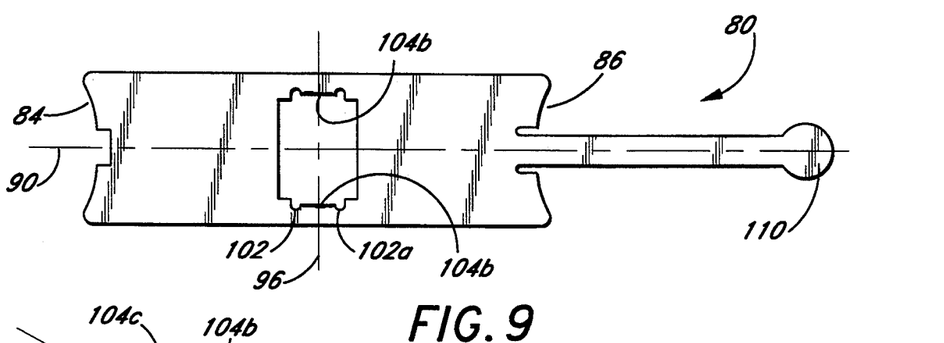
FIG. 9 shows a plan view of the surge restrainer of FIG. 7 after a first step during formation.
Figures 10, 11:
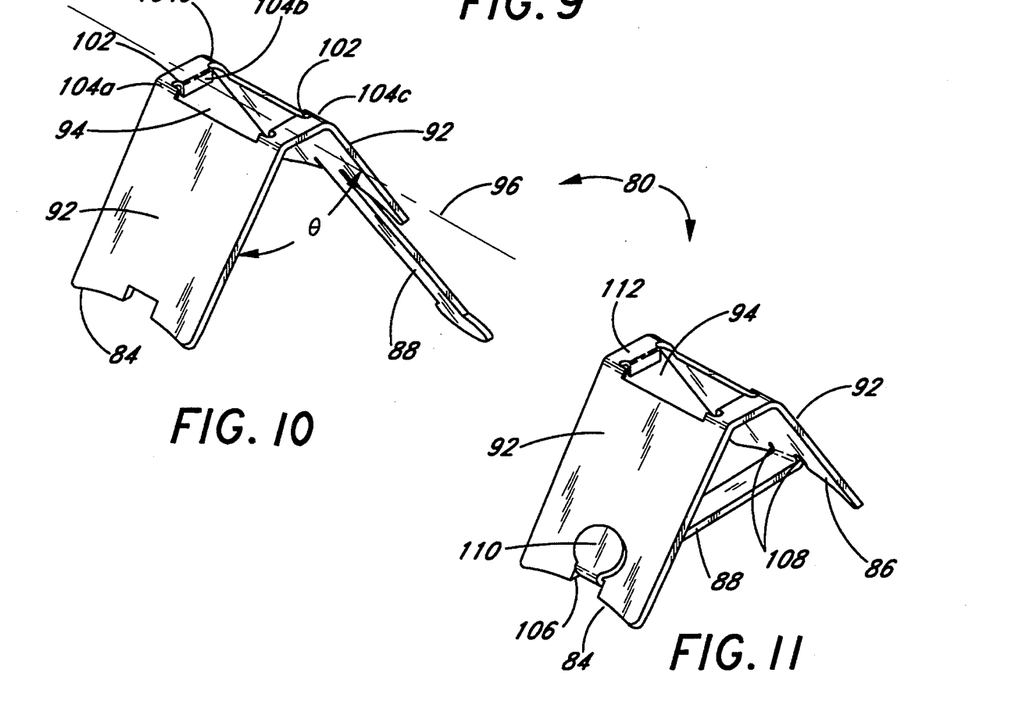
FIG. 10 shows a perspective view of the surge restrainer of FIG. 7 after a second step during formation.
FIG. 11 shows a perspective view of an assembled surge restrainer of FIG. 7.

The pipe surge restrainer 80 is produced by folding the initially flat, shaped piece of metal to form a generally triangular shape. As shown in FIG. 9, each of the rectangular members 104b on the first sides 98 of the aperture 94 is folded such that there is approximately a 90 degree angle between the rectangular member 104b and both the transverse 96 and longitudinal axis 90 of the restrainer 80. Then, as shown in FIG. 10, the legs 92 are bent toward one another, the bends forming at the fold segments 104a and 104c along lines parallel to the transverse axis 96 and aligned with the semi-elliptical notches 102 in the aperture 94. The folded over rectangular members 104b buttress the area between the semi-elliptical notches 102 on each of the first sides 98 of the aperture 94. Thus, as the legs 92 are bent toward one another, the portion of the pipe surge restrainer 80 coincident with the aperture 94 does not buckle, and thereby remains flat.

Initially, the legs 92 are bent toward one another such that an approximately 65 degree angle is formed between the two legs 92. Then, as shown in FIG. 11, the tab 88 is bent such that it forms a base connecting the legs 92. The tab 88 is advantageously bent where the tab 88 connects with the second end 86 of the restrainer 80 facilitated by the notches 108 in the second end 86. The unattached end of the tab 88 inserts into the rectangular notch 106 in the first end 84, the circular tip 110 protruding past the notch 106. The circular tip 110 is then bent toward the aperture 94. Thus, the restrainer 80 forms a generally triangular unit with one flat apex 112 coincident with the aperture 94.

An operator may easily bend the legs 92 further toward one another, thereby reducing the angle $\Theta$ between the legs 92. It will be understood that when the legs 92 are bent closer together, the tab 88 may be pulled further through the rectangular notch 106 in the first end 84 of the restrainer 80 and a portion of the tab 88 may be bent, along with the circular tip 110 of the tab 88, toward the aperture 94 to secure the tab 88 in place.

The pipe surge restrainer 80 is advantageously constructed to make bending easy. Notches 102 and 108 are formed to facilitate bending the restrainer 80 into its generally triangular-shape. The semi-elliptical notches 102 are formed in the aperture 94 to facilitate bending of the rectangular members 104b to buttress the portion of the restrainer 80 coincident with the aperture 94 when the legs 92 are bent toward one another. The notches 108 cut in the second end 86 of the restrainer 80 at each side of the tab 88 facilitate the bending of the tab 88.

Figure 12:
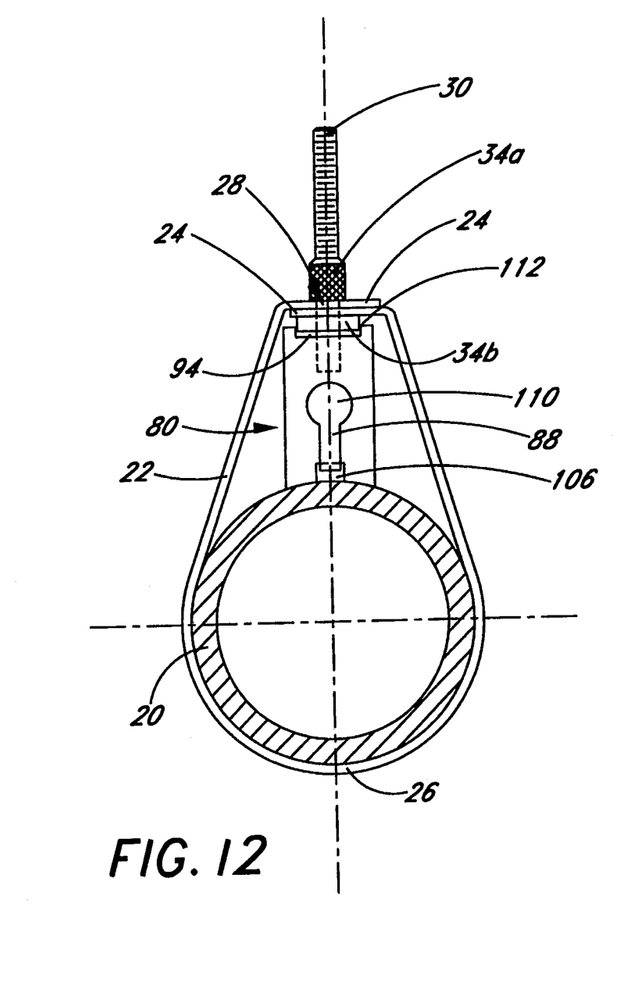
FIG. 12 shows a front elevational view of the surge restrainer of FIG. 7 in use.
Figure 13:
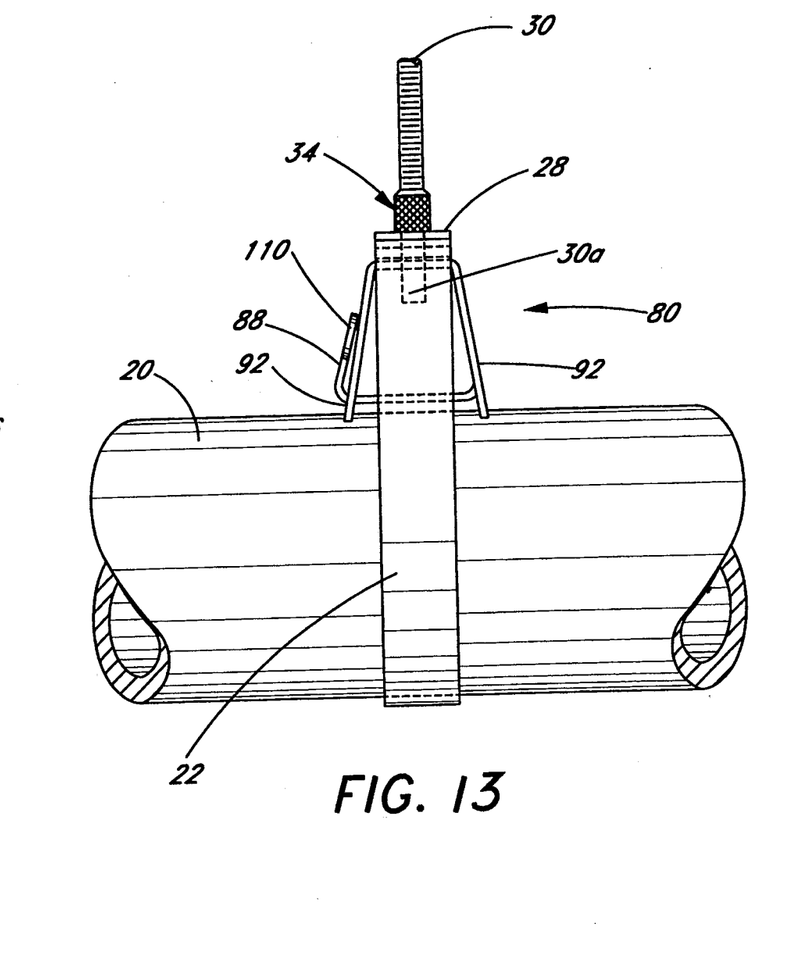
FIG. 13 shows a side elevational view of the surge restrainer of FIG. 7 in use.

To install the restrainer 80 correctly, the lower portion 30a of the hanging rod 30 inserts through the holes 32 in the ends 24 of the hanger and the swivel nut 34 threaded thereon. As discussed previously, the pipe surge restrainer 80 is employed with pipe hangers 22 having a space of about one to two inches between the pipe 20 and the yoke 28 of the pipe hanger 22, as shown in FIGS. 7, 12 and 13. The restrainer 80 is installed in the interior of the pipe hanger 22, between the pipe 20 and the overlapping ends 24 of the pipe hanger 22. The generally flat apex 112 abuts the overlapping ends 24 of the pipe hanger 22 and the concave ends 84 and 86 of the surge restrainer 80 lie adjacent the pipe 20. The concave ends 84 and 86 may be formed having a curvature which advantageously accepts a predetermined pipe 20 size. The aperture 94 is advantageously formed to accept the collar 34b on the swivel nut 34. The downwardly extending portion of the hanging rod 30 inserts into the aperture 94. The legs 92 of the restrainer 80 are bent further toward one another until the flat area 112 of the restrainer 80 coincident with the aperture 94 abuts the overlapping ends 24 of the pipe hanger 22. As discussed previously, the position of the legs 92 relative one another may easily be adjusted, thereby varying the angle $\Theta$ between the legs 92. A reduction of the angle $\Theta$ results in an increase in the vertical distance between the flat portion of the of the pipe surge restrainer 80 coincident with the aperture and a plane containing the ends 84 and 86 of the restrainer 80. Thus, the pipe surge restrainer 80 may be adjusted such that it fits into a variety of differently sized spaces between a pipe 20 and the yoke 28 of the pipe hanger 22. The tab 88 is bent at the notch 106 in the first end 84 toward the aperture 94 to re-secure it in place. Thus, the restrainer 80 fills the space between the pipe 20 and the overlapping ends 24 of the pipe hanger 22, thereby preventing pipe surge. Moreover, the concave curved ends 84 and 86 of the restrainer 80 bite into the material of which the pipe is made, thereby gripping the pipe 20 more securely.

In addition to maintaining the position of the pipe 20 within the pipe hanger 22 directly against the saddle 26 and gripping the pipe 20 securely, the pipe surge restrainer 80 ensures that the pipe hanger 22 cannot move with respect to the swivel nut 34, i.e., up and down along the axis of the hanging rod 30. The surge restrainer 80 forms a strut which effectively prevents motion of the pipe hanger 22 relative to the hanging rod 30 by not allowing the overlapping ends 24 of the pipe hanger 22 any room to move with respect to the hanging rod 30.

In one embodiment of the present invention for use in the fire sprinkler industry where liquid carrying pipes 20 are generally approximately one inch in diameter, between approximately twenty thousandths to forty thousandths inch thick pre-galvanized steel is employed to construct the surge restrainer 80.

Typical dimensions for a pipe surge restrainer 80 used in this instance are approximately five inches long when unbent, the length between the first and second ends 84 and 86 being approximately $2\frac{3}{4}$ inches and the tab 88 being approximately $2\frac{1}{4}$ inches long. The width between the sides 82 of the restrainer 80 is typically approximately one inch.

The first and second ends 84 and 86 form generally semicircular concave curves having a radius of curvature of approximately one inch, but radii greater than the curvature of the pipe are considered acceptable. The rectangular notch 106 cut in the first end 84 of the restrainer 80 is approximately ¼ of an inch wide and is cut 1/10 of an inch inwardly toward the aperture 94. The tab 88 extending from the second end 86 is slightly narrower than ¼ inch wide.

The generally rectangular aperture 94 is approximately ⅜ inches wide between the first set of sides 98 and ½ inch wide between the second set of sides 100. The semi-elliptical notches 102 are located approximately 1/10 of an inch inward from each of the second set of sides 100. The semi-elliptical notches 102 are formed such that the apex 102a of each is located approximately 1/10 of an inch away from the sides 82 of the restrainer 80.

It will be understood that the concave curved ends of the restrainer may be rolled such that the ends do not bite into the pipe.

What is claimed is:

1. A pipe surge restrainer for a pipe and a hanger supporting the pipe to restrict upward surging movement of the pipe within the hanger towards an upper yoke of the hanger caused by fluid pressure surfaces in the pipe, said restrainer comprising:

a pair of spaced legs sized to extend between said yoke and said pipe, the upper ends of said legs defining a gap therebetween for receiving the lower end of a pipe hanger rod extending through said yoke;

a connector joining the lower ends of said legs; and a pair of spaced arms, each arm being spaced above but connected to said legs for securing said restrainer in position between said pipe and said yoke, and each arm having a section formed to grip a nut mounted on said rod, said restrainer being formed of springy material that enables said arms to be spread and grip the nut, and enable said arms to be installed or removed from said pipe and hanger with said hanger is position supporting said pipe.

2. The restraint of claim 1, wherein said restrainer is made from a flat metal plate which is bent into the shape described in claim 1.

3. The restraint of claim 1, in combination with said pipe hanger, said hanger rod and said pipe.

4. An assembly for use in supporting and restraining a pipe, said assembly comprising:

a hanger having a yoke at a top end and a saddle at a lower end shaped to support a pipe with space between the yoke and the pipe;

a hanger rod having a lower end extending through holes in said yoke;

a swivel nut threaded on the lower end of said rod, said swivel nut including a collar sized greater than holes in said yoke to allow said hanger rod to support said hanger; and a pipe restrainer having two downwardly extending walls having a gap therebetween for receiving the lower end of said hanger rod, said walls forming a support between said yoke and said pipe to restrict upward surging movement of said pipe caused by fluid pressure surges in said pipe, said walls being generally thin, flat, and rectangular, said restrainer including a connector joining the lower ends of said walls, and said walls having horizontal slots open to receive said yoke and said collar of said swivel nut to enable the restrainer to be installed in said space after said rod and hanger have been assembled supporting said pipe.

5. An assembly for use in supporting and restraining a pipe, said assembly comprising:

a hanger having a yoke at a top end and a saddle at a lower end shaped to support a pipe with space between the yoke and the pipe;

a hanger rod extending through holes in said yoke;

a swivel nut threaded onto the lower end of said rod with a shank extending upwardly through the holes in said yoke and with a collar on its lower end having a diameter larger than said holes so that the hanger is supported on said rod by said nut; and a pipe restrainer having two downwardly extending walls having a gap therebetween for receiving the lower end of said hanger rod, said walls forming a support between said yoke and said pipe to restrict upward surging movement of said pipe caused by fluid pressure surges in said pipe, a connector joining the lower ends of said walls, said restrainer being constructed to enable it to be installed in said space after said rod and hanger have been assembled supporting said pipe, said restrainer including a clip formed by a pair of upper arms spaced above but formed integral with said walls, said arms being formed to grip said shank to secure the restrainer to the assembly.

6. The restraint of claim 5, wherein said walls, said clip and said connector are formed from an elongated flat plate made of stiff but bendable metal, said plate being bendable at a pair of spaced junctures at the connection between said walls and said connector, said clip being formed by elongated horizontal slots in each wall defining said upper arms, said arms being bent into an opposing arcuate surfaces sized to grip said swivel nut shank on said hanging rod.

7. A pipe restrainer for restricting upward movement of a pipe located in a pipe hanger, said restrainer comprising:

two spaced, generally parallel walls having upper and lower ends;

a connector joining the lower ends of said walls;

a bridge extending upwardly from the upper end of each of said walls, along one side of each wall; a clip arm connected to each of said bridges and extending generally perpendicular to said bridges and parallel to said walls, each clip arm including a nut retaining section for gripping a nut in the gap between said clip arms, said arms being springy so that they may be spaced to receive a nut and then grip the nut to secure the restrainer to an installed pipe hanger assembly.

* * * * *

UNITED STATES PATENT AND TRADEMARK OFFICE
CERTIFICATE OF CORRECTION

PATENT NO. : 5,344,108
DATED : September 6, 1994
INVENTOR(S) : Richard W. Heath

It is certified that error appears in the above-indentified patent and that said Letters Patent is hereby corrected as shown below:

Column 9, line 28, change "surface" to --surges--.

Column 9, line 44, change "is" to --in--.

Column 9, line 46, change "restraint" to --restrainer--.

Column 9, line 49, change "restraint" to --restrainer--.

Column 10, line 38, change "restraint" to -restrainer--.

Signed and Sealed this

Third Day of January, 1995

Attest:

BRUCE LEHMAN

Attesting Officer

Commissioner of Patents and Trademarks